US008379001B2

(12) United States Patent
Saitoh et al.

(10) Patent No.: US 8,379,001 B2
(45) Date of Patent: Feb. 19, 2013

(54) LIQUID CRYSTAL DISPLAY DEVICE

(75) Inventors: Akihiko Saitoh, Minato-ku (JP); Hiroyuki Kimura, Minato-ku (JP)

(73) Assignee: Japan Display Central Inc., Fukaya-shi (JP)

( * ) Notice: Subject to any disclaimer, the term of this patent is extended or adjusted under 35 U.S.C. 154(b) by 630 days.

(21) Appl. No.: 12/645,512

(22) Filed: Dec. 23, 2009

(65) Prior Publication Data

US 2010/0201653 A1 Aug. 12, 2010

(30) Foreign Application Priority Data

Feb. 9, 2009 (JP) ................................ 2009-027753

(51) Int. Cl.
*G06F 3/038* (2006.01)

(52) U.S. Cl. ............. 345/204; 345/38; 345/103; 345/55

(58) Field of Classification Search ........................ None
See application file for complete search history.

(56) References Cited

U.S. PATENT DOCUMENTS 7,932,880 B2 * 4/2011 Takahara et al. ................ 345/76
8,081,178 B2 * 12/2011 Yamazaki ..................... 345/209
2006/0208995 A1 9/2006 Saitoh et al.
2008/0079680 A1 * 4/2008 Fujita ............................. 345/89

FOREIGN PATENT DOCUMENTS

JP 2007-114576 5/2007

OTHER PUBLICATIONS

U.S. Appl. No. 13/188,550, filed Jul. 22, 2011, Saitoh.

* cited by examiner

*Primary Examiner* — Muhammad N Edun
(74) *Attorney, Agent, or Firm* — Oblon, Spivak, McClelland, Maier & Neustadt, L.L.P.

(57) ABSTRACT

A liquid crystal display device includes first and second display panels each including scan lines arranged in a row direction, signal lines arranged in a column direction, and pixels arranged in a matrix at intersections of the first scan lines and the first signal lines. The first display panel and the second display panel are set in a non-display mode and in a display mode, respectively. Shift registers and buffer circuits connected to respective groups of scan lines sequentially drive respective group of scan lines in the first display panel during a vertical blanking time of the second display panel. The pixels of the first display panel are driven to refresh by writing an image signal for a black display in the first display panel.

23 Claims, 7 Drawing Sheets

LIQUID CRYSTAL DISPLAY DEVICE

CROSS-REFERENCE TO RELATED APPLICATION

This application is based upon and claims the benefit of priority from prior Japanese Patent Application No. 2009-027753 filed Feb. 9, 2009, the entire contents of which are incorporated herein by reference.

BACKGROUND OF THE INVENTION

1. Field of the Invention

The present invention relates to a liquid crystal display device having a plurality of display panels, such as a sub-panel and a main panel and more particularly to achievement of a high quality liquid crystal display device.

2. Description of the Background Art

Liquid crystal display devices are widely used for various kinds of equipment such as personal computers, OA equipment, and TV sets because they have many advantages such as lightness, compactness and low power consumption. In recent years, the liquid crystal display device has also been used in mobile terminal equipment such as a mobile phone, a car navigation device and a game player. Such liquid crystal display devices include a liquid crystal display panel formed of a plurality of pixels and a backlight unit to illuminate the pixels.

Each of pixels includes a pixel electrode connected to a signal line through a thin film transistor (TFT), a counter electrode and a liquid crystal layer held between the pixel electrode and the counter electrode. A voltage is applied between the pixel electrode and the counter electrode and pictures are displayed. Recently, a mobile phone with a main display panel and a smaller sub-display panel has been widely used. The main display panel has characteristics such that picture resolution is high and the displayed color is robust. The sub-panel is provided to show not only limited information such as time or remaining amount of an installed battery but also a view of a camera.

Japanese laid open patent application No. 2007-114576 discloses a twin type display in which the main panel is connected to the sub-panel through a flexible printed circuit board and the two panels are arranged back to back with a back light unit interposed between the two panels. Common power and signals are applied to the sub-panel through common power supply lines and signal supply lines arranged in the main panel and extending to the sub-panel. In the above construction, if the main panel is not displayed and the sub-panel is displayed, only scan lines arranged in the sub-panel are driven and images in the sub-panel are displayed corresponding to signals applied to the signal lines. Though, the scan lines of the main panel are not sequentially driven and the switch elements of the pixels in the main panel are off, a leak current may be generated and result in a reduction in the display quality of the main panel.

BRIEF SUMMARY OF THE INVENTION

The present invention has been made to address the above mentioned problems. One object of this invention is to provide a high quality liquid crystal display device with a plurality of display panels.

Thus, according to one aspect of the invention, there is provided a liquid crystal display device, including a first display area including first scan lines arranged in a row direction, first signal lines arranged in a column direction and first pixels arranged in a matrix at interconnections of the first scan lines and the first signal lines; a second display area including second scan lines arranged in the row direction, second signal lines arranged in the column direction and second pixels arranged in a matrix at intersections of the second scan lines and the second signal lines; a first scan line driving unit to drive the first scan lines and a second scan line driving unit to drive the second scan lines; a signal line driving unit to drive the first and second signal lines; and wherein at least some of the first signal lines and the second signal lines are connected each other, and when the first display area is in a non-display mode and the second display area is in a display mode, the first scan line driving unit sequentially drives some of the first scan lines during a vertical blanking time of the second display area.

According to another aspect of the invention, there is provided a liquid crystal display device comprising: a first display area including first scan lines arranged in a row direction, first signal lines arranged in a column direction and first pixels arranged in a matrix at intersections of the first scan lines and the first signal lines; a second display area including second scan lines arranged in the row direction, second signal lines arranged in the column direction and second pixels arranged in a matrix at intersections of the second scan lines and the second signal lines; a first scan line driving unit formed in the first display area to drive the first scan lines, including gate buffer circuits connected to the first scan lines, a sequential scan circuit to apply first sequential scan signals to respective gate buffer circuits, a refresh scan circuit to commonly supply second sequential scan signals to grouped gate buffer circuits, and a switch circuit to select one of the sequential scan circuit and the refresh scan circuit; a second scan line driving unit formed in the second display area to drive the second scan lines; and a signal line driving unit to drive the first and second signal lines, and wherein at least some of the first signal lines and the second signal lines are connected to each other, and when the first display area is in a non-display mode and the second display area is in a display mode, the first scan line driving unit sequentially drives some of the first scan lines during a vertical blanking time of the second display area.

According to further another aspect of the invention, there is provided a method for displaying a liquid crystal display device, including a first and a second display panel, each display panel comprising scan lines arranged in a row direction, signal lines arranged in a column direction, and pixels arranged in a matrix at intersections of the first scan lines and the first signal lines, including steps; setting the first display panel in a non-display mode and the second display panel in a display mode; providing shift registers and gate buffer circuits connected to associated shift registers to drive selected groups of first scan lines in the first display panel; driving the shift registers during a vertical blanking time of the second display panel; sequentially selecting groups of the grouped scan lines; selecting the first pixels arranged along the selected scan lines; refreshing the first pixels by writing an image signal for a black display in a normally black mode or an image signal for a white display in a normally white mode.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
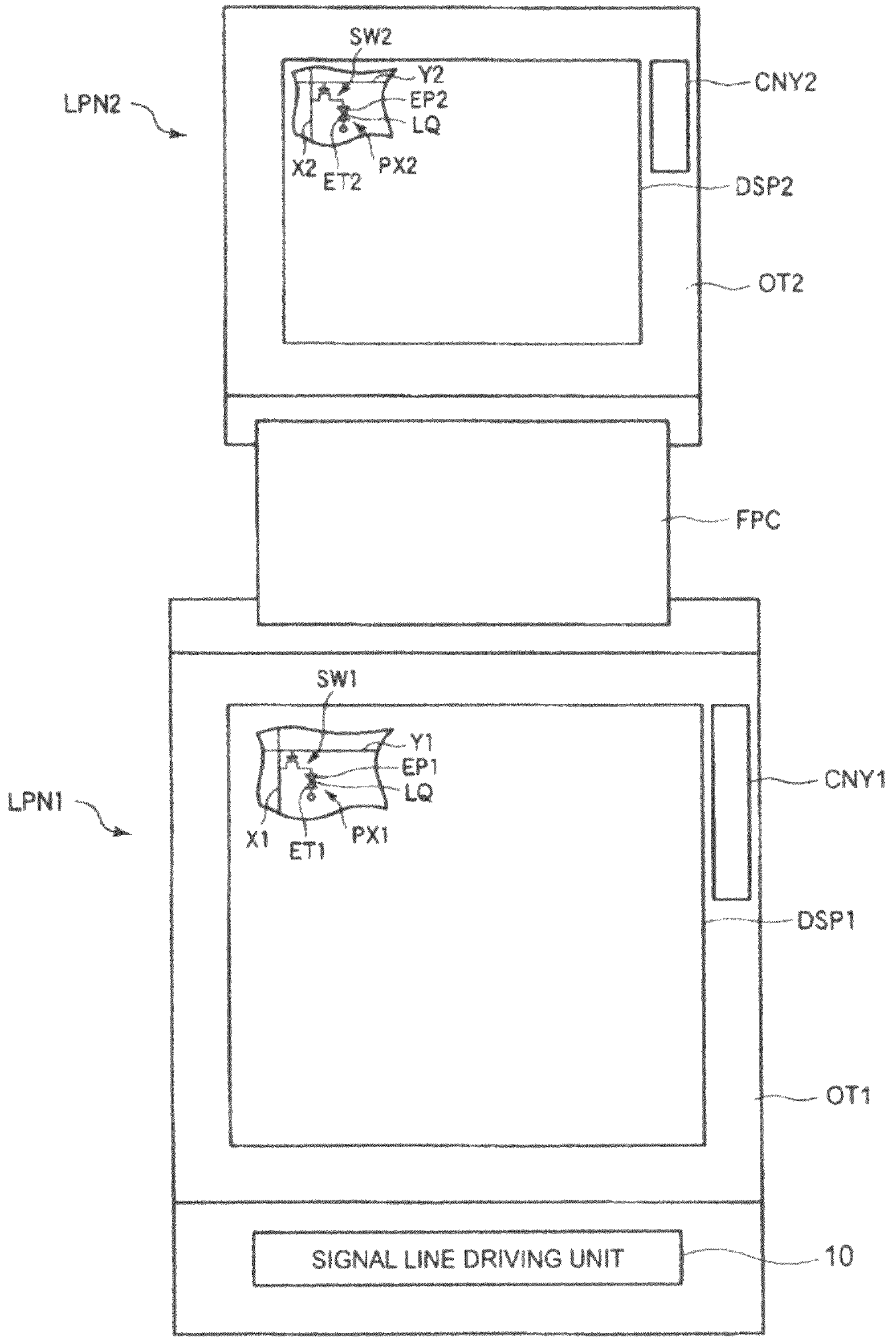
FIG. 1 is a schematic block diagram showing a liquid crystal device with a plurality of a liquid crystal panels according to a first embodiment of the invention.

A liquid crystal display device according to an exemplary embodiment of the present invention, in particular, a liquid crystal display device having a plurality of display panels, such as a sub-panel and a main panel will now be described with reference to the accompanying drawings wherein the same or like reference numerals designate the same or corresponding parts throughout the several views.

In the present invention, a refresh operation of the first pixels arranged in a first display panel is conducted. For example, when the first display panel is not displayed and the second display panel is displayed, the refresh operation is conducted during a blanking time of the second display panel, particularly, a vertical blanking time.

Hereinafter, a liquid crystal display device according to a first embodiment will be explained referring to figures.

FIG. 1 is a schematic block diagram showing a liquid crystal device with a plurality of a liquid crystal panels according to a first embodiment of the invention. The liquid crystal display device includes a first liquid crystal panel LPN1 (main display panel) and a second liquid crystal panel LPN 2 (sub-display panel). The first and second liquid crystal panels LPN 1 and LPN 2 are electrically connected each other by a flexible printed circuit board FPC. First liquid crystal panel LPN1 and second liquid crystal panel LPN 2 are both configured by holding a liquid crystal layer between a pair of substrates. The first liquid crystal panel LPN1 and the second liquid crystal panel LPN 2 include a first display area DSP1 and a second display area DSP2 in a substantially rectangular shape, respectively.

The first display area DSP1 includes a plurality of first pixels PX1 arranged in a matrix, first scan lines Y1 arranged along the pixels in a row direction, first signal lines X1 arranged along the pixels in a column direction, first switch elements SW1 arranged at intersections of the first scan lines Y1 and the first signal lines X1, first pixel electrodes EP1 connected to the first switching elements SW1 in the first pixels PX1 and a first counter electrode ET1 arranged so as to face the first pixel electrodes EP1.

Similarly, the second display area DSP2 includes a plurality of second pixels PX2 arranged in a matrix, second scan lines Y2 arranged along the pixels in the row direction, second signal lines X2 arranged along the pixels in the column direction, second switch elements SW2 arranged at intersections of the second scan lines and the second signal lines, second pixel electrodes EP2 connected to the second switching elements SW2 in the second pixel. PX2 and a second counter electrode ET2 arranged so as to face the second pixel electrodes EP2.

In a color liquid crystal display device, the first and second pixels PX1 and PX2 are formed of a plurality of sub-pixels PX, for example, a red color sub-pixel, a green color sub-pixel and a blue color sub-pixel, respectively. The gate electrodes of the first switching elements SW1 and the second switching elements SW2 are connected to the first and second scan lines Y1 and Y2, respectively, or integrally formed with the first and second scan lines Y1 and Y2.

Source electrodes of the first switch element SW1 and the second switch element SW2 are connected to the first and second signal lines X1 and X2 or formed integrally with the first and second signal lines X1 and X2.

Drain electrodes of the first switch element SW1 and the second switch element SW2 are respectively connected to the first and second pixel electrodes EP1 and EP2. The first switch element SW1 and the second switch element SW2 are, for example, formed of thin film transistors (TFTs) having a semiconductor layer made of amorphous or poly-silicon.

The first and second pixel electrodes EP1 and EP2 of the first and second pixels PX1 and PX2 are arranged facing the first and second counter electrodes ET1 and ET2. The first and second pixel electrodes EP1 and EP2 are formed of a transmissive conductive material such as Indium Tine Oxide (ITO) or Indium Zinc Oxide (IZO). Similarly, the first and second counter electrodes ET1 and ET2 are also formed of ITO or IZO.

The number of the first and second signal lines X1 and X2 may be equal or the number of one of the first and second signal lines X1 and X2 may be smaller than the other. Some of the signal lines of the first and second signal lines X1 and X2 are connected to each other. That is, at least some of the first signal lines X1 and the second signal lines X2 extend to an intermediate region between the first and second display areas DSP1 and DSP2 and are electrically connected.

The first and second display panels LPN1 and LPN2 include respective driving units to drive the display panels. A first scan line driving unit CNY1 is arranged in a peripheral region OT1 located outside of the first display panel LPN1 and a second scan line driving unit CNY2 is also arranged in a peripheral region OT2 located outside of the second display panel LPN2. A signal line driving unit 10 is arranged on one of the first and second display panels LPN1 and LPN2. As mentioned-above, the driving unit includes the first scan line driving unit CNY1, the second scan line driving unit CNY2 and the signal line driving unit 10. The first scan line driving unit CNY1 supplies scan signals to the first scan lines Y1 arranged in the first display area DSP1. Similarly, the second scan line driving unit CNY2 supplies scan signals to the second scan lines Y2 arranged in the second display area DSP2. The image signals are applied to the second signal lines X2 through the first signal lines X1 supplied from the signal line driving unit 10.

Writing operation of image signals into the first and second display panels LPN1 and LPN2 is made by a horizontal line inversion driving method. Here, a LCD display operation according to the present invention taken a case, for example, in which the first display panel LPN1 is non-display mode, and the second display panel LPN2 is display mode will be explained. In this case, when a normally black display mode is adopted, the non-display mode means "the black display." On the other hand, when a normally white display mode is adopted, the non-display mode means "the white display." In this embodiment, a refresh driving refers to when the second display panel LPN2 drives "display," that is, image signals are applied to the pixels from an outside signal source, and the first display panel LPN1 drives "non-display."

Figure 2:
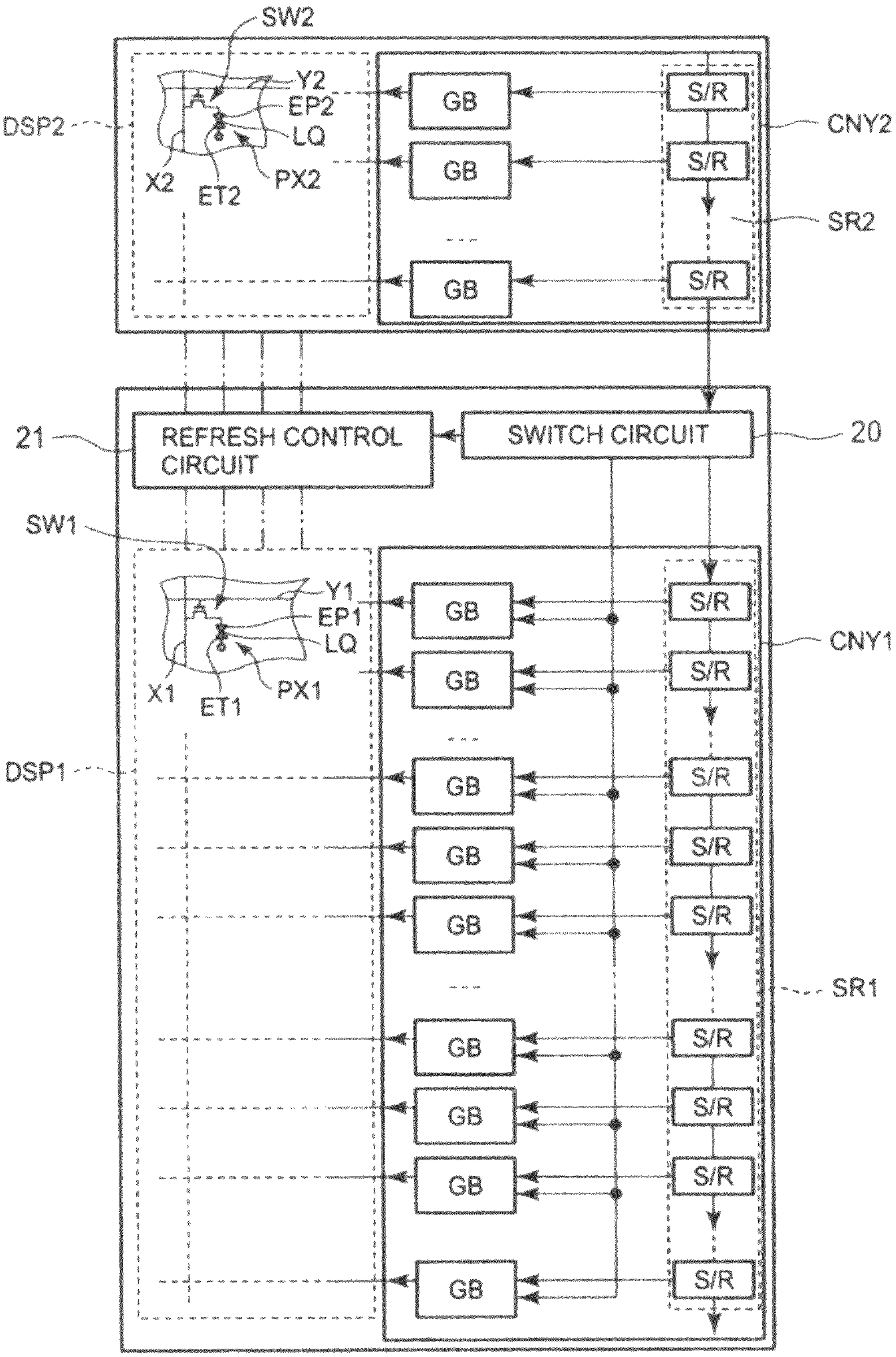
FIG. 2 is a schematic block diagram showing a structure of first and second scan line driving units of the liquid crystal display device shown in FIG. 1 according to the first embodiment of the invention.

In this embodiment, the signal line driving unit 10 is arranged in the first display panel LPN1 and all the second signal lines X2 are connected to some of the first signal lines X1 through a flexible printed circuit board FPC. The constructions of the first and second scan line driving units CNY1 and CNY2 are shown in FIG. 2.

The first scan line driving unit CNY1 includes gate buffer circuits GB connected to edges of the first scan lines Y1, a first sequential scanning circuit SR1 with a plurality of first shift registers connected to an input terminal side of the gate buffer circuits GB. The first scan line driving unit CNY1 includes a switch circuit 20 in which supply of the scan signals is switched over to the first sequential scanning circuit SR1 or all the gate buffer circuits GB directly. The refresh control circuit 21 is arranged between the first display area DSP1 and the second display area DSP2 so that the first signal lines X1 are connected to the second signal lines X2 through the refresh control circuit 21. The refresh control circuit 21 conducts a refresh operation during a vertical blanking time of the second display panel LPN2. A detailed construction of the refresh control circuit 21 will be explained later. The second scan line driving unit CNY2 includes gate buffer circuits GB connected to the end portions of the second scan lines Y2 and a second sequential scanning circuit SR2 connected to the input terminal side of the respective gate buffer circuits GB.

Figure 3:
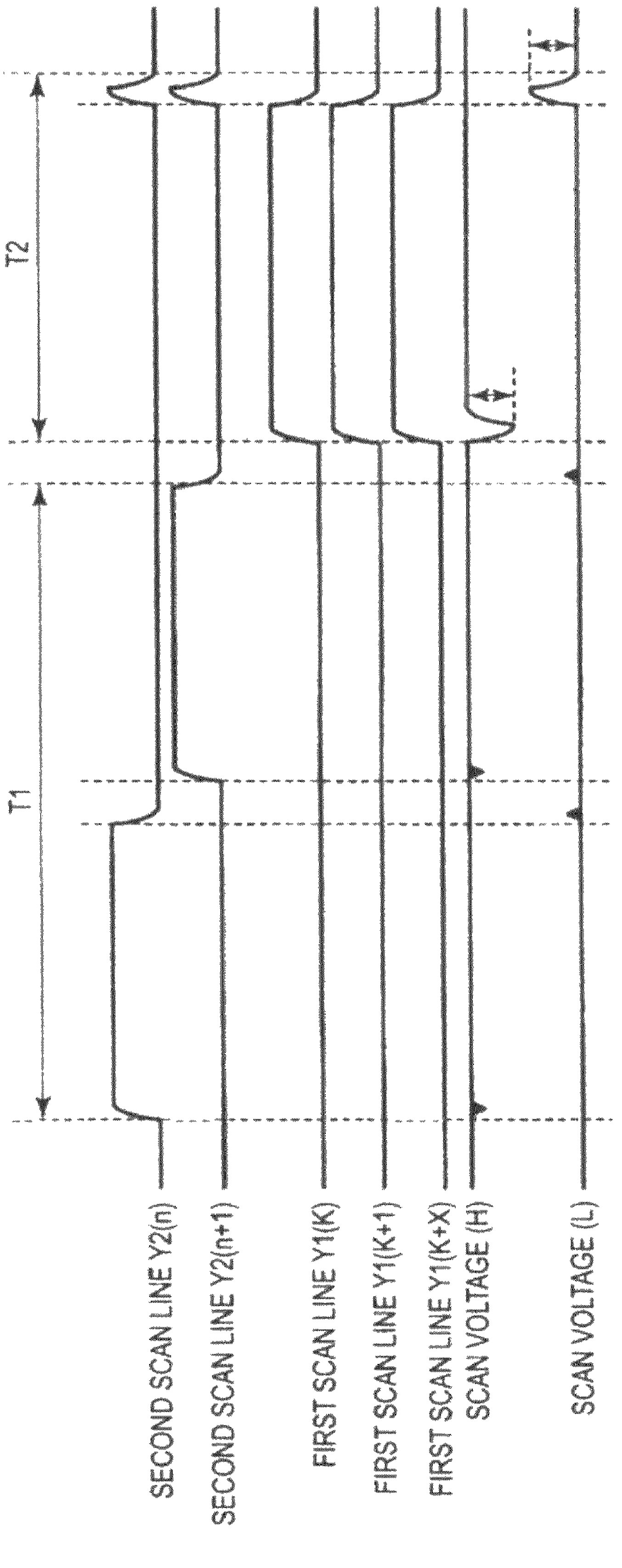
FIG. 3 is a timing diagram showing scan line voltages of the first and second scan line driving units shown in FIG. 2 according to the first embodiment of the invention.

Referring to FIG. 3, an operation of the first and second scan line driving units CNY1 and CNY2 according to the first embodiment will be explained. As shown in FIG. 3, firstly, at time T1, scan signals are sequentially input to the second shift registers S/R 2(*n*) in the second scan line driving unit CNY2. The second shift registers S/R 2(*n*) in the second scan line driving unit CNY2 output scan signals to the gate buffer circuits GB (n) and the second shift resister S/R 2(*n*+1), respectively at a next timing after the first scan signal is input. When the gate buffer circuits GB(n) output the scan signals to the second scan lines Y2 (*n*), corresponding second scan lines Y2 are selected. That is, the second scan lines Y2 are sequentially driven by the second scan line driving unit CNY2 and second switching elements SW2 connected to the selected second scan lines Y2 become "ON." Further, image signals are supplied to the second signal lines X2 through the first signal lines X1 by means of the signal line driving circuit 10 and the image signals are written into the selected switching elements SW2 to display pictures in the second display panel LPN2.

At time T2, scan signals are simultaneously applied to all the gate buffer circuits GB in the first display panel LPN1 through the switch circuit 20. Accordingly, all the first scan lines Y1 are selected and image signals are supplied to all the first signal lines X1 to refresh all the first pixels PX1. Here, time T2 is a vertical blanking time of the second display panel LPN2. The blanking time means the period while the writing of image signals into the last pixel line of the second display area DSP2 terminates during a frame and a next frame period starts.

Figure 4:
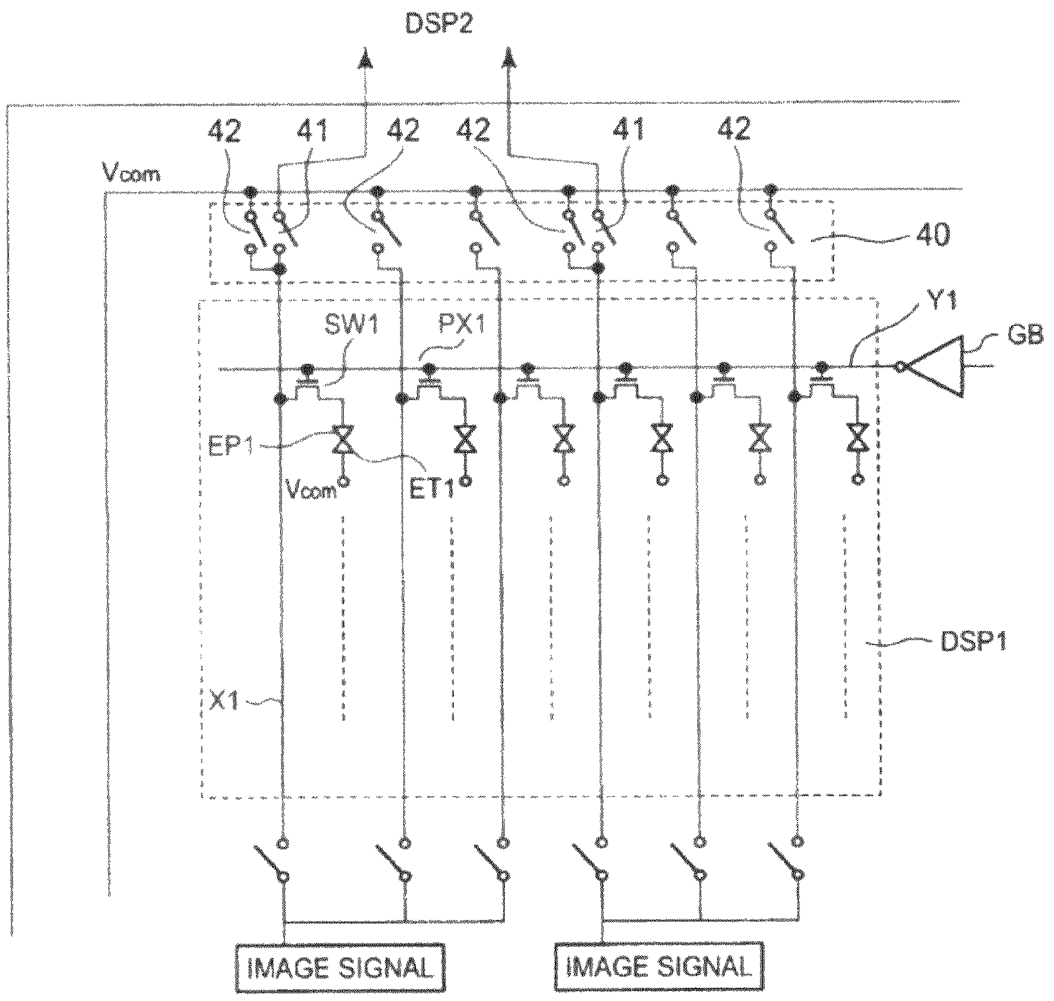
FIG. 4 is a circuit diagram showing a refresh control circuit used in the scan driving unit in the display panel shown in FIG. 1.

FIG. 4 is a circuit diagram showing a refresh control circuit 21 used in the first scan line driving unit CNY1 in the display panel shown in FIG. 1. Some of the first signal lines X1 are connected to the second signal lines X2 through switches 41 in a switch unit 40 formed in the refresh control circuit 21. When the refresh operation is conducted, all the first signal lines X1 are connected to a common voltage Vcom line through switches 42. That is, during a blanking time of the second display panel LPN2, the switches 42 become "ON" and the switches 41 become "OFF" and the common voltage Vcom is applied to the pixel electrodes EP1 of the first pixels PX1 connected to the first signal lines X1. Therefore, the same voltage Vcom is applied between the pixel electrode EP1 and the common electrode ET1 and a black picture is displayed in a normally black mode. According to this refresh operation, current leak in the first switching elements SW1 is prevented when the first display panel LPN1 is in a non-display mode and the second display panel LPN2 is in a display mode.

Figure 5:
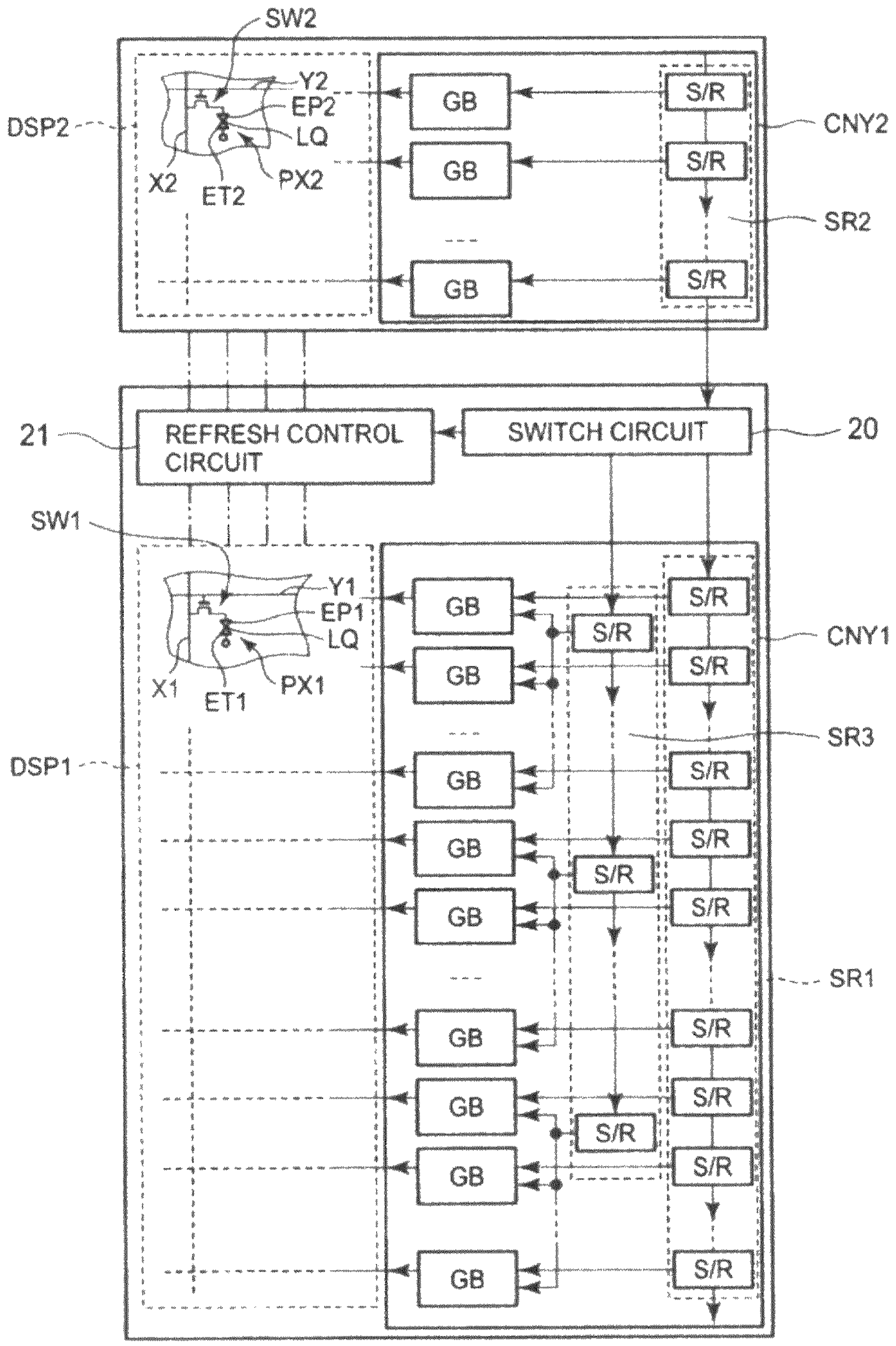
FIG. 5 is a schematic block diagram showing a structure of the first and second scan line driving units of the liquid crystal display device shown in FIG. 1 according to the second embodiment of the invention.

FIG. 5 is a schematic diagram showing a structure of the first and second scan line driving units of the liquid crystal display device shown in FIG. 1 according to the second embodiment of the invention.

If all the scan lines Y1 of the first display pane LPN1 are driven to refresh the first pixels SW1 as shown in the first embodiment, noise may be generated in the scan lines at a timing when the first switching elements SW1 are simultaneously "ON" or "OFF" as shown in FIG. 3. Therefore, the display quality is impaired due to input of incorrect image signals to the second pixels PX2. That is, if the noise become sufficiently large, the second switching elements SW2 in the second pixel PX2 may be temporarily conductive. If so, unintentional images signals are applied to the second pixel electrodes EP2 of the second pixels PX2 during the blanking time of the second display panel. In this second embodiment, a refresh scan circuit SR3 having a plurality of third shift registers is provided in the first scan line driving unit CNY1 to eliminate the above problem.

As shown in FIG. 5, in the first scan line driving unit CNY1, each of the third shift registers S/R (k)~(k+x) in the refresh scan circuit SR3 is connected to the grouped gate buffer circuits GB. The scan signals are applied to the third shift registers S/R (k)~(k+x) in the refresh scan circuit SR3 through the switch circuit 20. Each of the third shift registers S/R (k)~(k+x) sequentially outputs the scan signals to the grouped gate buffer circuits GB. Consequently, the scan signals are sequentially applied to the grouped first scan lines Y1 (*k*)~(k+x) by the first scan line driving unit CNY1. In this second embodiment, all the scan lines Y1 in the first display area DSP1 are divided into five groups in which one group is constructed by sixty four scan lines Y1 and all the scan lines Y1 of each group are simultaneously driven.

Here, the number of the first scan lines Y1 that are simultaneously driven to refresh the first pixels PX1 by the first scan line driving unit CNY1 is more than two. By the divided refresh driving for the grouped first scan lines Y1, a noise effect to the scan voltages in the first scan lines Y1 and the second scan lines Y2 due to the grouping of the first scan lines Y1 may be decreased compared with the case in which all the first scan lines Y1 are simultaneously driven to refresh the first pixels PX1 shown in the first embodiment.

Figure 7:
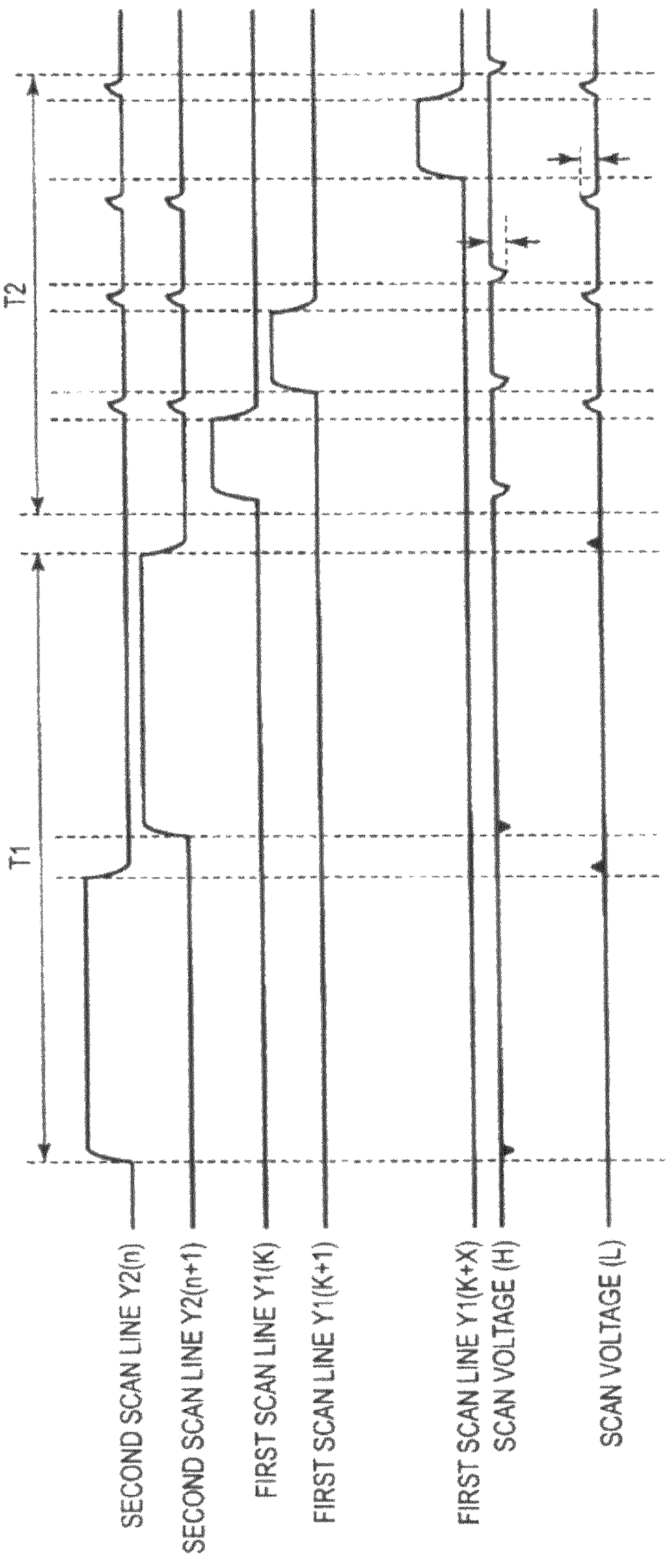
FIG. 7 is a timing diagram showing scan line voltages of the first and second scan line driving units shown in FIG. 5 according to the second embodiment of the invention.

In the refresh operation according to this embodiment as shown in FIG. 7, it is possible to reduce noise when refreshing the first scan lines Y1 by grouping the first scan lines Y1 in a predetermined number without driving all the first scan lines Y1 simultaneously. According to this second embodiment, the noise does not affect scan lines connected to the second pixels PX2. Since the second scan lines Y2 may not be temporarily selected by the noise, reduction in the display quality of the second display panel LPN2 can be suppressed.

Next an effect according to this embodiment will be explained using a liquid crystal display device including first display panel LPN1 (resolution 240×320) and a second display panel LPN2 (resolution 120×160). Each of three signal lines to apply display signals to a red pixel, a green pixel and a blue pixel is sequentially driven by using a three selection driving method.

Figure 6:
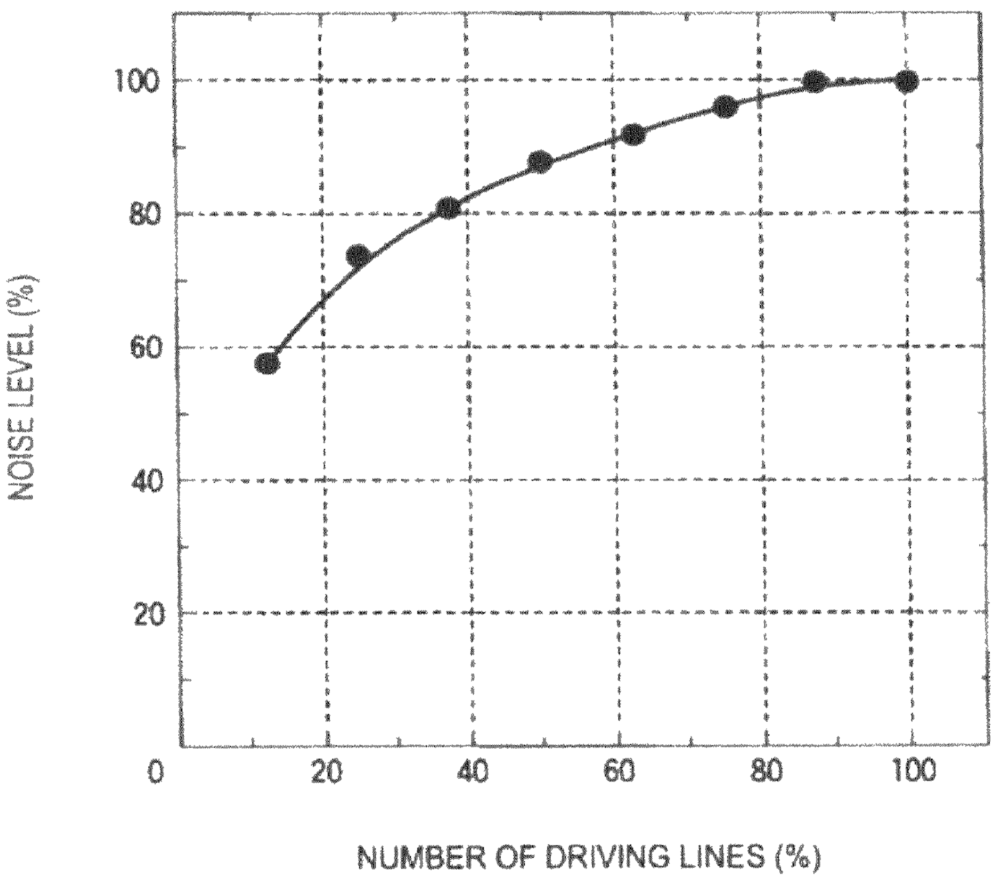
FIG. 6 is a graph showing an experimental noise levels obtained upon dividing the first scan lines into groups to refresh first pixels according to the second embodiment of the invention.

FIG. 6 is a diagram showing an experimental result by grouping the first scan lines Y1 to refresh the first pixels SW1 in the first display panel LPN1. FIG. 6 shows a relationship between the noise level (%) and number of the grouped first scan lines Y1 (%) driven together among all the first scan lines Y1 in the first display panel LPN1. The relative noise level (%) is a ratio comparing the noise level when all the first scan lines Y1 are simultaneously driven to refresh.

According to a measurement result shown in FIG. 6, it is confirmed that the noise level (%) decreases with the number of the driven scan lines Y1 (%). For example, when the number of the driven scan lines Y1 becomes smaller than 20(%), the noise level decreases to about 60% of the level in which all the first scan lines Y1 are simultaneously driven. That is, if the number of groupings of the first scan lines Y1 increases, the affect of noise becomes small.

As shown in FIG. 7, the first scan lines Y1 are selected during the vertical blanking time of the second display panel LPN2. Negative polarity noises are generated in the scan voltages (H), that are applied to the second pixels PX2, at the timing when the first scan lines Y1 are selected and positive polarity noises are generated in the scan voltages (L) at the timing when the first scan lines Y1 are returned to the non-selected condition. The level of the noise in this second embodiment is smaller than that shown in the first embodiment in FIG. 3

In FIG. 6, when all the scan lines Y1 are selected to refresh the first pixels pix1, the noise level is shown as 100(%). The noise level (a peak voltage of the noise relative to the scan voltage) generated in the second scan lines Y2 increases with the number of the first scan lines Y1 driven simultaneously. Accordingly, as shown in FIG. 3, if all the scan lines Y1 are simultaneously driven, undesired signal voltages may be supplied to the second pixels PX2 through the second switching elements SW2. However, according to this second embodiment, the plurality of first scan lines Y1 are divided into groups and the grouped first scan lines Y1 are sequentially driven in group by group. Therefore, the noise level is made low and the undesired supply of the image signal voltage to the second pixels PIX2 is suppressed.

According to the present invention, it is possible to provide a liquid crystal display device with a plurality of LCD panels which can achieve a high display quality.

The present invention is not limited directly to the above described embodiments. In practice, the structural elements can be modified without departing from the spirit of the invention. Various inventions can be made by properly combining the structural elements disclosed in the embodiments. For example, some structural elements may be omitted from all the structural elements disclosed in the embodiments. Furthermore, structural elements in different embodiments may properly be combined. It is to therefore be understand that within the scope of the appended claims, the present invention may be practiced other than as specifically disclosed herein.

What is claimed is:

1. A liquid crystal display device comprising:

a first display area including first scan lines arranged in a row direction, first signal lines arranged in a column direction and first pixels arranged in a matrix at intersections of the first scan lines and the first signal lines;

a second display area including second scan lines arranged in the row direction, second signal lines arranged in the column direction and second pixels arranged in a matrix at intersections of the second scan lines and the second signal lines;

a first scan line driving unit formed in the first display area to drive the first scan lines and a second scan line driving unit formed in the second display area to drive the second scan lines; and a signal line driving unit to drive the first and second signal lines; and wherein at least some of the first signal lines and the second signal lines are connected to each other, and when the first display area is in a non-display mode and the second display area is in a display mode, the first scan line driving unit drives some of the first scan lines during a vertical blanking time of the second display area.

2. The liquid crystal display device according to claim 1, wherein the first display area includes a refresh control circuit to supply an image signal corresponding to a black display to the first signal lines.

3. The liquid crystal display device according to claim 2, wherein the first and second pixels each include a pixel electrode and a counter electrode having a liquid crystal layer interposed therebetween, and the refresh control circuit includes a switch unit to selectively connect the first signal lines to the second signal lines in the second display area or a common voltage Vcom line, and the first signal lines connected to the Vcom line supply the common voltage Vcom to the pixel electrodes of non-displayed pixels.

4. The liquid crystal display device according to claim 3, wherein in case that the first display area is in a non-display mode and the second display area is in a display mode, the same voltage Vcom is applied between the pixel electrode and the common electrode of the first pixel to display a black image by refreshing the first pixels.

5. The liquid crystal display device according to claim 4, wherein the refresh control circuit is arranged between the first signal lines and the second signal lines.

6. A liquid crystal display device comprising:

a first display area including first scan lines arranged in a row direction, first signal lines arranged in a column direction and first pixels arranged in a matrix at intersections of the first scan lines and the first signal lines;

a second display area including second scan lines arranged in the row direction, second signal lines arranged in the column direction and second pixels arranged in a matrix at intersections of the second scan lines and the second signal lines;

a first scan line driving unit formed in the first display area to drive the first scan lines, including gate buffer circuits connected to the first scan lines, a sequential scan circuit to apply first sequential scan signals to respective gate buffer circuits, a refresh scan circuit to commonly supply second sequential scan signals to grouped gate buffer circuits, and a switch circuit to select one of the sequential scan circuit and the refresh scan circuit;

a second scan line driving unit formed in the second display area to drive the second scan lines; and a signal line driving unit to drive the first and second signal lines, and wherein at least some of the first signal lines and the second signal lines are connected to each other, and when the first display area is in a non-display mode and the second display area is in a display mode, the first scan line driving unit sequentially drives some of the first scan lines during a vertical blanking time of the second display area.

7. The liquid crystal display device according to claim 6, wherein the first scan line driving unit sequentially drives more than two first scan lines in a group during the vertical blanking time of the second display area.

8. The liquid crystal display device according to claim 6, wherein the first and second pixels each include interposed pixel electrode and a counter electrode having a liquid crystal layer therebetween, and a refresh control circuit includes a switch unit to selectively connect the first signal lines to the second signal lines in the second display area or a common voltage Vcom line, and the first signal lines connected to the Vcom line supply the voltage Vcom to the pixel electrodes of non-displayed pixels.

9. The liquid crystal display device according to claim 6, wherein in case that the first display area is in a non-display mode and the second display area is in a display mode, the same voltage Vcom is applied between the pixel electrode and the common electrode of the first pixel to display a black image by refreshing the first pixels.

10. The liquid crystal display device according to claim 6, wherein the liquid crystal display device is a mobile phone display device.

11. A liquid crystal display device, comprising:

a main display panel including first scan lines arranged in a row direction, first signal lines arranged in a column direction and first pixels arranged in a matrix at interconnections of the first scan lines and the first signal lines;

a sub-display panel including second scan lines arranged in the row direction, second signal lines arranged in the column direction and second pixels arranged in a matrix at interconnections of the second scan lines and the second signal lines;

a back light unit arranged back to back between the main display panel and sub-display panel;

a first scan line driving unit to drive the first scan lines, including gate buffer circuits connected to respective first scan lines, a sequential scan circuit to apply first sequential scan signals to respective gate buffer circuits, a refresh scan circuit to commonly supply second sequential scan signals to grouped gate buffer circuits, and a switch circuit to select one of the sequential scan circuit and the refresh scan circuit;

a second scan line driving unit formed on the first display panel to drive the second scan lines; and a signal line driving unit to drive the first and second signal lines, and wherein a size of the sub-display panel is smaller than the main display panel and at least some of the first signal lines and the second signal lines are connected to each other, and when the main display area is in a non-display mode and the sub-display area is in a display mode, the first scan line driving unit sequentially drives some of the first scan lines during a vertical blanking time of the second display area.

12. The liquid crystal display device according to claim 11, wherein the liquid crystal display device is a mobile phone display device.

13. The liquid crystal display device according to claim 11, wherein the first scan line driving unit sequentially drives more than two first scan lines during the vertical blanking time of the second display area.

14. The liquid crystal display device according to claim 11, wherein the display area includes a refresh control circuit to supply an image signal corresponding to a black display to the first signal lines during the vertical blanking time of the second display panel.

15. The liquid crystal display device according to claim 14, wherein the first and second pixels each include a pixel electrode and a counter electrode interposing a liquid crystal layer therebetween, and the refresh control circuit includes a switch unit to selectively connect the first signal lines to the second signal lines in the second display area or a common voltage Vcom line, and the first signal lines connected to the Vcom line supply the voltage Vcom to the pixel electrodes of non-displayed pixels in the first display panel.

16. The liquid crystal display device according to claim 15, wherein in case that the first display area is in a non-display mode and the second display area is in a display mode, the same voltage Vcom is applied between the first pixel electrode and the common electrode to display a black image by refreshing the first pixels in the first panel.

17. A method for displaying a liquid crystal display device, including first and second display panels, each display panel comprising scan lines arranged in a row direction, signal lines arranged in a column direction, and pixels arranged in a matrix at intersections of the scan lines and the signal lines, comprising the steps of;

setting the first display panel in a non-display mode and the second display panel in a display mode;

providing shift registers and gate buffer circuits connected to associated shift registers to drive selected groups of scan lines in the first display panel;

driving the shift registers sequentially during a vertical blanking time of the second display panel;

sequentially selecting groups of the grouped scan lines;

selecting the first pixels arranged along the selected scan lines; and refreshing the first pixels by writing an image signal for a black display in a normally black mode or an image signal for a white display for a white mode.

18. The method for displaying a liquid crystal display device according to claim 17, wherein the refreshing is made by a refresh control circuit which includes a switch unit to selectively connect the first signal lines to the second signal lines in the second display area or a common voltage line Vcom, and the first signal lines connected to the Vcom line supply the common voltage Vcom to pixel electrodes of non-displayed pixels.

19. The method for displaying a liquid crystal display device according to claim 17, wherein respective first and second pixels includes a pixel electrode and a counter electrode interposing a liquid crystal layer therebetween, and the same voltage Vcom is applied between the pixel electrode and the common electrode to refresh the first pixels by displaying a black images.

20. A method for displaying a liquid crystal display device, including first and second display panels, each display panel comprising scan lines arranged in a row direction, signal lines arranged in a column direction, and pixels arranged in a matrix at intersections of the first scan lines and the first signal lines, comprising steps of;

setting the first display panel in a non-display mode and the second display panel in a display mode;

providing shift registers and gate buffer circuits connected to associated shift registers to drive selected groups of scan lines in the first display panel;

driving the shift registers sequentially during a vertical blanking time of the second display panel;

sequentially selecting groups of the grouped scan lines;

selecting pixels arranged along the selected scan line; and refreshing the pixels by writing an image signal for a black display in a normally black mode or an image signal for a white signal in a normally white mode, and wherein the first display panel and the second display panel are arranged back to back and connected through a flexible printed circuit board, the size of the second display panel is smaller than the first display panel, and some of the first signal lines extend to the second display panel on the printed circuit board.

21. The method for displaying a liquid crystal display device according to claim 20, comprising using the liquid crystal display device in a mobile phone.

22. The method for displaying a liquid crystal display device according to claim 21, wherein the liquid crystal display device includes a back light unit interposed between the first and second display panels.

23. The method for displaying a liquid crystal display device according to claim 20, wherein the refreshing is made by a refresh control circuit which includes a switch unit to selectively connect the first signal lines to the second signal lines in the second display area or a common voltage line Vcom, and the first signal lines connected to the Vcom line supply the common voltage Vcom to pixel electrodes of non-displayed pixels.

* * * * *